March 9, 1943.　　　K. BRENKERT　　　2,313,317
INTERMITTENT MOVEMENT ASSEMBLY
Filed Aug. 1, 1940　　　2 Sheets-Sheet 1
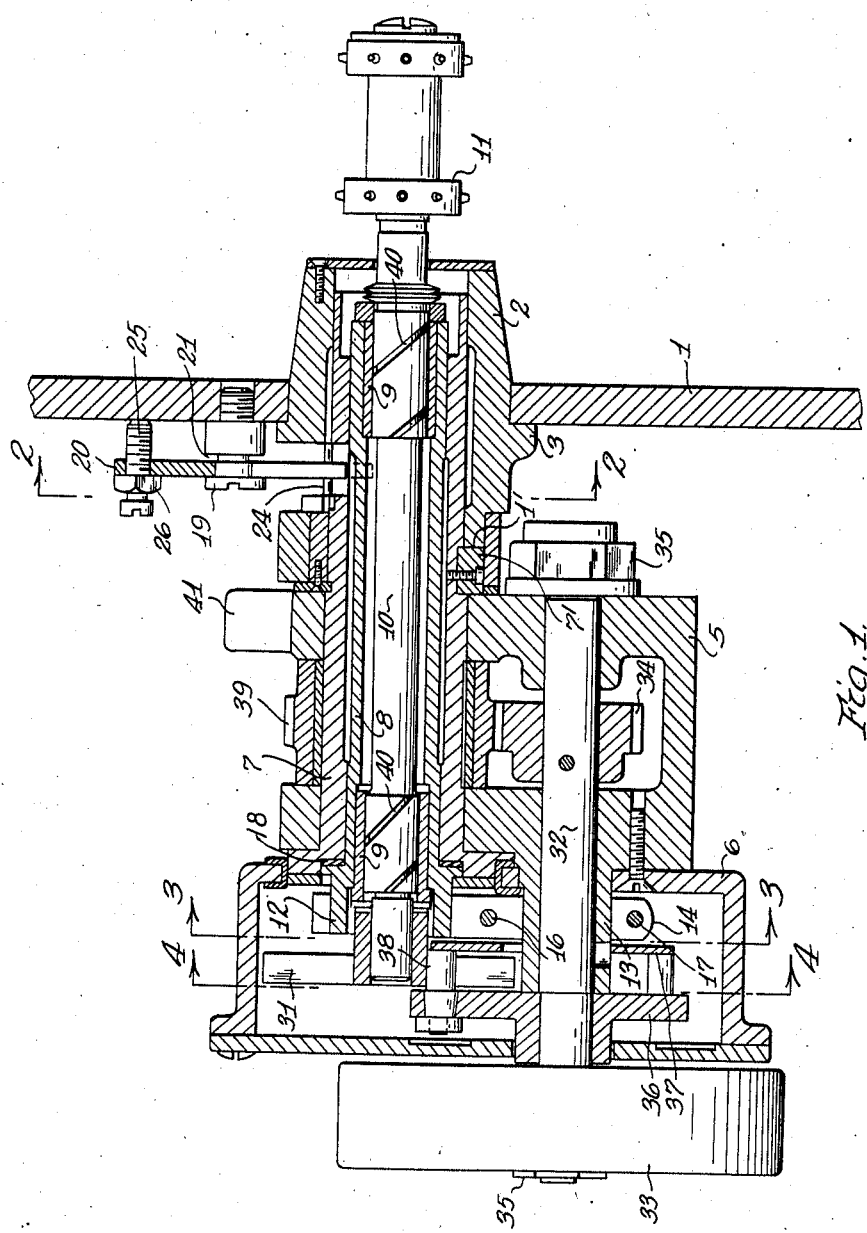
INVENTOR.
Karl Brenkert
BY Samuel Weisman March 9, 1943.                K. BRENKERT                2,313,317
                    INTERMITTENT MOVEMENT ASSEMBLY
                       Filed Aug. 1, 1940            2 Sheets-Sheet 2
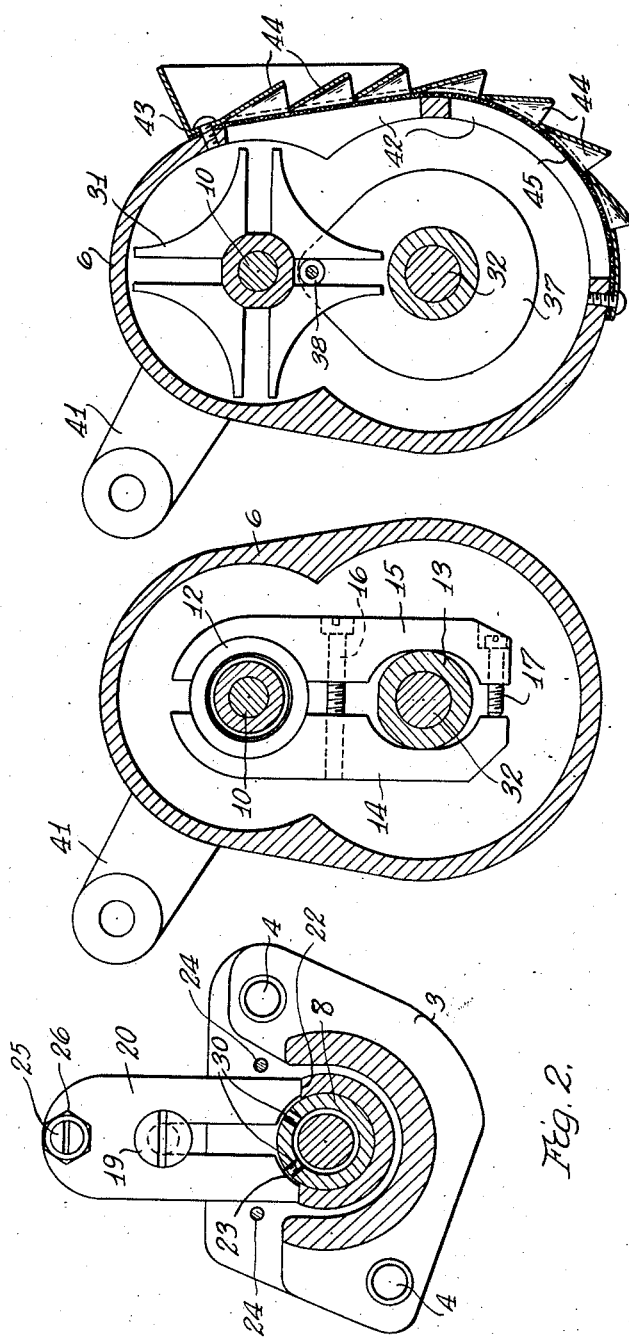
INVENTOR.
Karl Brenkert
BY Samuel Weisman Patented Mar. 9, 1943

2,313,317

UNITED STATES PATENT OFFICE

2,313,317

INTERMITTENT MOVEMENT ASSEMBLY

Karl Brenkert, Detroit, Mich., assignor to Brenkert Light Projection Company, Detroit, Mich., a corporation of Michigan Application August 1, 1940, Serial No. 349,136

17 Claims. (Cl. 74—395)

The present invention pertains to a novel intermittent assembly for motion picture projectors, wherein the intermittent movement is of the Geneva type. The parts of this mechanism must be adjusted very carefully, and it has therefore become customary to furnish, for replacement purposes, a complete unit or assembly rather than individual pieces.

The film feeding sprocket shaft, which is incorporated in the unit and connected with the Geneva wheel, must be adjusted very accurately in its bearings. In prior constructions the bearing holder for this shaft, in a replacement unit, is exposed and must be mounted by the operator or mechanic who makes the installation. Under such circumstances it is practically impossible to journal the shaft with the degree of accuracy required, due to distortion of the bearings, and the result is almost always an installation that is at least slightly defective.

The principal object of this invention is to overcome this difficulty and is accomplished by providing a unit in which the sprocket shaft holder is already fully journalled in an outer member. The unit includes such an outer member which is non-rotating and encloses the sprocket shaft holder. A device is provided for securing this member to the frame-work of the projector. During the securing operation, no interference with the bearings of the shaft and their holder, which were assembled at the factory, is possible.

The invention also includes a means for making and securing the final adjustment of the Geneva wheel to its operating cam. The wheel is carried by the sprocket shaft, so that the adjustment of the wheel is in reality an adjustment of the shaft. The shaft has its bearings in a sleeve which in turn is mounted in the non-rotating member mentioned above. The bearings are slightly eccentric in the sleeve, from which it follows that an adjustment of the sleeve rotatable relatively to the shaft constitutes an adjustment between the Geneva wheel and the cam.

The invention is fully disclosed by way of example in the following description and in the accompanying drawings in which:

Figure 1 is a longitudinal vertical section of the device;

Figure 2 is a section on the line 2—2 of Figure 1;

Figure 3 is a section on the line 3—3 of Figure 1, and

Figure 4 is a section on the line 4—4 of Figure 1.

The interior of a commercial projector is divided into two distinct compartments separating the film and sprockets from the lubricated mechanism. The compartments are formed by a vertical partition in the projector housing, and in this case the partition is indicated by the numeral 1. A boss 2 is inserted in the partition and is formed with a flange 3 secured to the partition by screws 4.

This constitutes the fixed structure by which the intermittent mechanism is located and at least partially supported as a unit. The following description of the intermittent unit is not necessarily in the order of assembly.

The intermittent unit is assembled in a case 5 to one end of which is attached a housing 6 of substantially ovoid shape and having its outer end open. A fixed sleeve 7 extends through the case 5 and into the boss 2 and is locked relatively to the partition 1 by means presently to be described, while the case 5 is adapted to be adjusted rotatably on the sleeve 7 for framing, as will also be described below. The sleeve 7 has a locating lug 7' received in a notch 1' cut in the boss 2. Within the sleeve 7 is fitted another sleeve 8 with bearings 9 inserted in its ends. In these bearings is accurately journalled the sprocket shaft 10 which extends through the boss 2 into the film compartment and carries the feed sprocket 11. The latter is mounted on the sprocket shaft in a suitable manner but preferably as shown in my co-pending application, Patent No. 2,269,429 of January 13, 1942.

The sleeve 8 has a shouldered or enlarged extension 12 projecting into the casing 6, and the case 5 has a reduced extension or bearing 13 projecting into the casing 6. A clamp consisting of two similar parts 14, 15 is applied to the extensions 12, 13 and is tightened by a screw 16 disposed between the extensions. A spreading screw 17 prevents a distorting pressure on the bearing 13. Thus, as the parts 5 and 6 are turned about the fixed sleeve 7 in the framing, the inner sleeve 8 and the adjusted bearing 9 therein also turn. The clamp 14, 15 has merely a line contact with the bearing 13 so that there is no side play, and no distorting radial force is exerted on this bearing and the accurately mounted cam shaft 32 during framing.

A washer spring 18 is inserted between one end of the fixed sleeve 7 and the shouldered extension 12 to take up the end play of the sleeve 8, the position of which is very critical since it carries the sprocket shaft. The spring also exerts pressure between the fixed sleeve 7 and the parts that turn on it in framing, so that the latter parts, although adjustable, are held against vibration in any given position of adjustment.

The sleeve 7 is held against rotation in the boss 2 by a device that will now be described. A channeled screw 19 is mounted in the partition 1 on the mechanism side. A clamp in the nature of a fork 20 is slipped over the screw 19 at the channel 21 thereof and is fulcrumed at this point for movement lengthwise of the sprocket shaft. Beneath the clamp 20, the sleeve 7 is slotted at 22 to receive the lower end of the clamp which is suitably shaped at 23. To avoid contact with the adjustable sleeve 7, the extremities of the fork engage the end walls of the slot 22. The slot is considerably wider than the thickness of the fork and receives two pins 24 engaging opposite sides of the fork and extending respectively into the boss 2. A set screw 25 with lock nut 26 is threaded through the upper end of the clamp 20 and engages the partition 1. By means of this screw the inner end of the clamp is swung against a vertical wall of the slot 22 to drive the member 7 firmly into the boss 2. At the slot 22, the sleeve 8 is formed with oil holes 30 permitting lubricant to pass to the sprocket shaft bearings after it has flowed through the space in the fork and under the edges 23.

Within the case 6, the shaft 10 carries a Geneva or star wheel 31. A cam shaft 32 is journalled in the parts 5, 6 and carries a flywheel 33 outside of the casing 6. A spiral gear 34 is fixed to the shaft 32 within the case 5, and the assembly is secured by suitable nuts 35 on both ends of the shaft. Within the casing 6 the shaft 32 carries the so-called cam consisting of a pair of disks 36, 37 between which is mounted a pin 38 adapted to enter the slots of the Geneva wheel 31, as well known in the art. On the fixed sleeve 7 and within the case 5 is also rotatably mounted a spiral gear 39 meshing with the gear 34 and to which power is applied as shown in the above mentioned copending application. It is now evident that the constant rotation of the shaft 32 is converted through the cam and star wheel into intermittent rotation of the sprocket shaft 10 and sprocket 11.

The inner wall of the inner sleeve 8, where the bearings 9 are received, is very slightly off center, for example a few ten-thousandths of an inch, with respect to the intermediate portion of the sleeve. Consequently the sprocket shaft 10 is also slightly eccentric with respect to the sleeve 8. The final adjustment of the replacement cam pin 38 to the star wheel 31 is obtained, if necessary, by turning the sleeve 8 on the bearings 9, which can be done by inserting a pin in one of the oil holes 30 before the clamp 20 is assembled and while the clamp 14, 15 is loose. The final adjustment is secured by tightening the latter clamp. The bearings 9 thereafter remained fixed in the sleeve and center distance between star wheel shaft 10 and cam shaft 32 is not disturbed in framing. The sprocket shaft 10 is preferably enlarged at the ends and formed with spiral lubricating grooves 40 where it turns in the bearings.

The case 5 is formed with a laterally extending lug 41 connected to suitable linkage and operating mechanism for adjustment of the case 5 and associated parts around the sleeve 7 in the framing operation, as fully disclosed in my Patent No. 2,246,972 of June 24, 1941.

As previously stated, the mounting of the sprocket shaft 10 and the cam shaft 32 in their bearings must be accurate within one or two ten-thousandths of an inch. The holder or sleeve 8 must be journalled accurately to .002 inch. It is customary to supply the intermittent mechanism as a unit for replacement purposes, with the sprocket shaft holder exposed and ready to be mounted in the frame of the projector by the operator. The unit here shown is removed after releasing the screw 19 and taking the sprocket 11 off its shaft 10. It is obvious however that the required highly accurate mounting of the sprocket shaft and its holder cannot be accomplished without distortion or error by the operator who has neither the skill nor the equipment necessary for such installation. Consequently, inaccuracy is inevitable when a replacement intermittent unit has been installed. This difficulty is overcome in the present invention due to the fact that the sprocket shaft and its holder are already journalled in the unit, and the operator need only lock and clamp the outer fixed sleeve 7 into the frame structure in the manner already described. Moreover, the final adjustment of the cam pin to the star wheel, which is also a delicate matter, is also made at the factory but can be re-set from time to time by the operator, if necessary, in the manner already described.

Although a specific embodiment of the invention has been illustrated and described, it will be understood that various alterations in the details of construction may be made without departing from the scope of the invention as indicated by the appended claims.

What I claim is:

1. In an intermittent unit, a tubular member, a framing case having a swivel mounting thereon, a sprocket shaft accurately journalled in said member, said member having an arcuate slot, and a fork adapted for attachment to the frame structure of a motion picture machine and to engage the ends of said slot, whereby to hold said member against rotation.

2. In an intermittent unit, a tubular member, a framing case having a swivel mounting thereon, a sprocket shaft accurately journalled in said member, a boss adapted for insertion in a wall of a motion picture machine and adapted to receive an end of said member, said member having an arcuate slot, and a fork adapted for attachment to said wall and to engage the ends of said slot, whereby to hold said member against rotation.

3. In an intermittent unit, a tubular member, a framing case having a swivel mounting thereon, a sleeve fitted in said member, a sprocket shaft accurately journalled in said sleeve, said member having an arcuate slot, and a fork adapted for attachment to the frame structure of a motion picture machine and to engage the ends of said slot, whereby to hold said member against rotation.

4. In an intermittent unit, a tubular member, a framing case having a swivel mounting thereon, a sleeve fitted in said member, a sprocket shaft accurately journalled in said sleeve, a boss adapted for insertion in a wall of a motion picture machine and adapted to receive an end of said member, said member having an arcuate slot, and a fork adapted for attachment to said wall and to engage the ends of said slot, whereby to hold said member against rotation.

5. In an intermittent unit, a tubular member, a framing case having a swivel mounting thereon, a sleeve fitted in said member, a sprocket shaft accurately journalled in said sleeve, means for securing said member non-rotatably in the frame structure of a motion picture machine, an outward shoulder formed on said sleeve, and an anti-vibration spring between said shoulder and said member.

6. In an intermittent unit, a tubular member, a framing case having a swivel mounting thereon, a sleeve fitted in said member, bearings fitted slightly eccentrically in said sleeve, a sprocket shaft accurately journalled in said bearings, a clamp secured to said sleeve and having a fixed pivotal axis in said case and means for securing said member non-rotatably in the frame structure of a motion picture machine.

7. In an intermittent unit, a tubular member, a framing case having a swivel mounting thereon, a sleeve fitted in said member, bearings fitted slightly eccentrically in said sleeve, a sprocket shaft accurately journalled in said bearings, a clamp secured to said sleeve and having a fixed pivotal axis in said case, said member having an arcuate slot, and a fork adapted for attachment to the frame structure of a motion picture machine and to engage the ends of said slot, whereby to hold said member against rotation, said sleeve having ports at said slot for lubrication and for access to turn said sleeve in said member.

8. In an intermittent unit, a tubular member, a framing case having a swivel mounting thereon, a sleeve fitted in said member, bearings fitted slightly eccentrically in said sleeve, a sprocket shaft accurately journalled in said bearings, a clamp secured to said sleeve and having a fixed pivotal axis in said case, means for securing said member non-rotatably in the frame structure of a motion picture machine, an outward shoulder formed on said sleeve, and an anti-vibration spring between said shoulder and said member.

9. In an intermittent unit, a tubular member, a framing case having a swivel mounting thereon, a sprocket shaft accurately journalled in said member, a boss adapted for insertion in a wall of a motion picture machine and adapted to receive an end of said member, said member having an arcuate slot, and a fork adapted for attachment to said wall and to engage the ends of said slot, whereby to hold said member against rotation, and a lug extending radially from said member, said boss having a notch adapted to receive said lug, whereby to determine the circumferential position of said member.

10. In an intermittent unit, a tubular member, a framing case having a swivel mounting thereon, a sprocket shaft accurately journalled in said member, adjustable bearings for said sprocket shaft eccentrically mounted in said tubular member, a clamp secured to said member and having a fixed pivotal axis in said case and means for securing said member non-rotatably in the frame structure of a motion picture machine.

11. In an intermittent unit, a tubular member, a framing case having a swivel mounting thereon, a sprocket shaft accurately journalled in said member, adjustable bearings for said sprocket shaft eccentrically mounted in said tubular member, and a clamp secured to said member and fixed relatively to said case to turn therewith about the axis of said sprocket shaft in the swivel movement of said case during framing, and means for securing said member non-rotatably in the frame structure of a motion picture machine.

12. In an intermittent unit, a tubular member, a framing case having a swivel mounting thereon, a sprocket shaft accurately journalled in said member, adjustable bearings for said sprocket shaft eccentrically mounted in said tubular member, a clamp secured to said member, another bearing carried by said case, said clamp being attached to the last named bearing to turn with said case about the axis of said sprocket shaft in the swivel movement of said case during framing, and means for securing said member non-rotatably in the frame structure of a motion picture machine.

13. In an intermittent unit, a tubular member, a framing case having a swivel mounting thereon, a sprocket shaft accurately journalled in said member, adjustable bearings for said sprocket shaft eccentrically mounted in said tubular member, a clamp secured to said member, another bearing carried by said case, said clamp having contact with the last named bearing at opposed locations to turn with said case about the axis of said sprocket shaft in the swivel movement of said case during framing, a spreading screw in said clamp to avoid excessive pressure on the last named bearing, and means for securing said member non-rotatably in the frame structure of a motion picture machine.

14. In an intermittent unit, a tubular member, a framing case having a swivel mounting thereon, a sprocket shaft accurately journalled in said member, and a clamp on said member, said clamp being fixed relatively to said case to turn therewith about the axis of said tubular member in the swivel movement of said case during framing, and means for securing said member non-rotatably in the frame structure of a motion picture machine.

15. In an intermittent unit, a tubular member, a framing case having a swivel mounting thereon, a sprocket shaft accurately journalled in said member, a bearing for said sprocket shaft mounted in said tubular member, and a clamp at said bearing to secure the same in said member, said clamp being fixed relatively to said case to turn therewith about the axis of said tubular member in the swivel movement of said case during framing, and means for securing said member non-rotatably in the frame structure of a motion picture machine.

16. In an intermittent unit, a tubular member, a framing case having a swivel mounting thereon, a sprocket shaft accurately journalled in said member, and a clamp on said member, another bearing carried by said case, said clamp being attached to the last named bearing to turn with said case about the axis of said tubular member in the swivel movement of said case during framing, and means for securing said member non-rotatably to the frame structure of a motion picture machine.

17. In an intermittent unit, a tubular member, a framing case having a swivel mounting thereon, a sleeve fitted in said member, a sprocket shaft accurately journalled in said sleeve, a boss adapted for insertion in a wall of a motion picture machine and adapted to receive an end of said member, a sprocket wheel carried by said shaft externally of said boss and of smaller diameter than said boss, and releasable means for securing said member non-rotatably in said boss, whereby on release of said means said member, case, shaft, boss and wheel may be withdrawn as a unit.

KARL BRENKERT.